(12) United States Patent
Marholev et al.

(10) Patent No.: US 7,881,677 B2
(45) Date of Patent: Feb. 1, 2011

(54) TRANSCEIVER SYSTEM AND METHOD OF USING SAME

(75) Inventors: Bojko F. Marholev, Irvine, CA (US); Jesus A. Castaneda, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 798 days.

(21) Appl. No.: 11/902,630

(22) Filed: Sep. 24, 2007

(65) Prior Publication Data

US 2008/0020717 A1 Jan. 24, 2008

Related U.S. Application Data

(63) Continuation of application No. 10/965,024, filed on Oct. 15, 2004, now Pat. No. 7,274,913.

(51) Int. Cl.
*H04B 1/44* (2006.01)

(52) U.S. Cl. .................. 455/78; 455/118; 455/119; 455/126; 455/127.1; 455/90.3; 333/177; 333/178

(58) Field of Classification Search ............... 455/78, 455/118, 119, 126, 127, 90.3; 333/177, 178
See application file for complete search history.

(56) References Cited

U.S. PATENT DOCUMENTS

| | | | | |
|---|---|---|---|---|
| 5,193,218 | A | * | 3/1993 | Shimo .................. 455/80 |
| 5,548,239 | A | * | 8/1996 | Kohama ................ 327/408 |
| 6,009,314 | A | * | 12/1999 | Bjork et al. ............ 455/83 |
| 6,487,398 | B1 | | 11/2002 | Nobbe et al. |
| 6,721,544 | B1 | | 4/2004 | Franca-Neto |
| 7,274,913 | B2 | | 9/2007 | Marholev et al. |
| 2003/0197488 | A1 | | 10/2003 | Hulvey |
| 2003/0197677 | A1 | | 10/2003 | Hulvey |
| 2003/0232605 | A1 | | 12/2003 | Peng |
| 2004/0021586 | A1 | | 2/2004 | Lou |
| 2004/0021632 | A1 | | 2/2004 | Lou |
| 2004/0021635 | A1 | | 2/2004 | Lou |
| 2004/0023680 | A1 | | 2/2004 | Hulvey |
| 2004/0024927 | A1 | | 2/2004 | Hulvey |
| 2004/0025065 | A1 | | 2/2004 | Lou |
| 2004/0025097 | A1 | | 2/2004 | Lou |
| 2004/0097265 | A1 | | 5/2004 | Cadieux et al. |
| 2004/0158750 | A1 | | 8/2004 | Syed et al. |
| 2004/0210720 | A1 | | 10/2004 | Wong et al. |

(Continued)

OTHER PUBLICATIONS

Meng-An Pan, U.S. Appl. No. 11/120,682, filed May 3, 2005, entitled "Single Side Band Transmissions".

(Continued)

*Primary Examiner*—Sanh D Phu
(74) *Attorney, Agent, or Firm*—Sterne, Kessler, Goldstein & Fox P.L.L.C.

(57) ABSTRACT

A chip comprises and operational section and an input/output section. The operational section includes a controller. The input/output (I/O) section is coupled to the operational section. The I/O section comprises a transformer and a switching device. The transformer includes a primary side connected to first and second I/O ports and a secondary side connected to the operational section. The switching device is coupled to the controller and between the first and second I/O ports and a bias port, such that, under control of the controller, the switching device connects one of the first and second I/O ports to the bias port.

20 Claims, 7 Drawing Sheets

U.S. PATENT DOCUMENTS

2004/0253939 A1    12/2004    Castaneda et al.

OTHER PUBLICATIONS

Hung-Ming Chien, U.S. Appl. No. 10/813,275, filed Mar. 31, 2004, entitled "An Oscillating Circuit Having a Noise Reduction Circuit".

Wenkwei Lou, U.S. Appl. No. 10/824,312, filed Apr. 14, 2004, entitled "Power Reduction for Unintentional Activation of a Wireless Input Device".

Wenkwei Lou, U.S. Appl. No. 10/930,577, filed Aug. 31, 2004, entitled "Wireless Remote Firmware Debugging for Wireless Bluetooth Device".

Henrik Jensen, U.S. Appl. No. 10/911,874, filed Aug. 5, 2004, entitled "Channel Select Filter and Applications Thereof".

Henrik Jensen, U.S. Appl. No. 10/922,532, filed Aug. 20, 2004, entitled "Continuous-Time Delta-Sigma ADC with Programmable Input Range".

Henrik Jensen, U.S. Appl. No. 10/999,531, filed Nov. 30, 2004, entitled "Complex Digital Phase Locked Loop for Use in a Demodulator and Method of Optimal Coefficient Selection".

*BCM2004 Product Brief: Bluetooth® Radio for Qualcomm®-Based Handsets*, Broadcom Corporation, 2 pages, Mar. 30, 2004.

*BCM2040 Product Brief: Single-Chip Bluetooth® Mouse and Keyboard*, Broadcom Corporation, 2 pages, Mar. 30, 2004.

* cited by examiner

US 7,881,677 B2

TRANSCEIVER SYSTEM AND METHOD OF USING SAME

CROSS REFERENCE TO RELATED APPLICATIONS

This application is a continuation of U.S. application Ser. No. 10/965,024, filed Oct. 15, 2004 (now U.S. Pat. No. 7,274,913), which is incorporated by reference herein in its entirety.

BACKGROUND OF THE INVENTION

1. Field of the Invention

The present invention is related to transceiver systems and methods, and more particularly to radio frequency transceivers.

2. Background Art

Recently, transceivers have most input/output (I/O) components located off-chip on a printed circuit board, or the like. However, this can lead to a large number of external components (i.e., components external to the chip), more complexity, and higher costs.

Therefore, what is needed is a single chip having an integrated transceiver I/O components that can be internally configured to reduce a number of external components.

BRIEF SUMMARY OF THE INVENTION

An embodiment of the present invention provides a system (e.g., a transceiver system) comprising an operational section and an input/output section. The operational section includes a controller. The input/output (I/O) section is coupled to the operational section. The I/O section comprises a transformer and a switching device. The transformer includes a primary side connected to first and second I/O ports and a secondary side connected to the operational section. The switching device is coupled to the controller and between the first and second I/O ports and a bias port, such that, under control of the controller, the switching device connects one of the first and second I/O ports to the bias port.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

Figure 1:
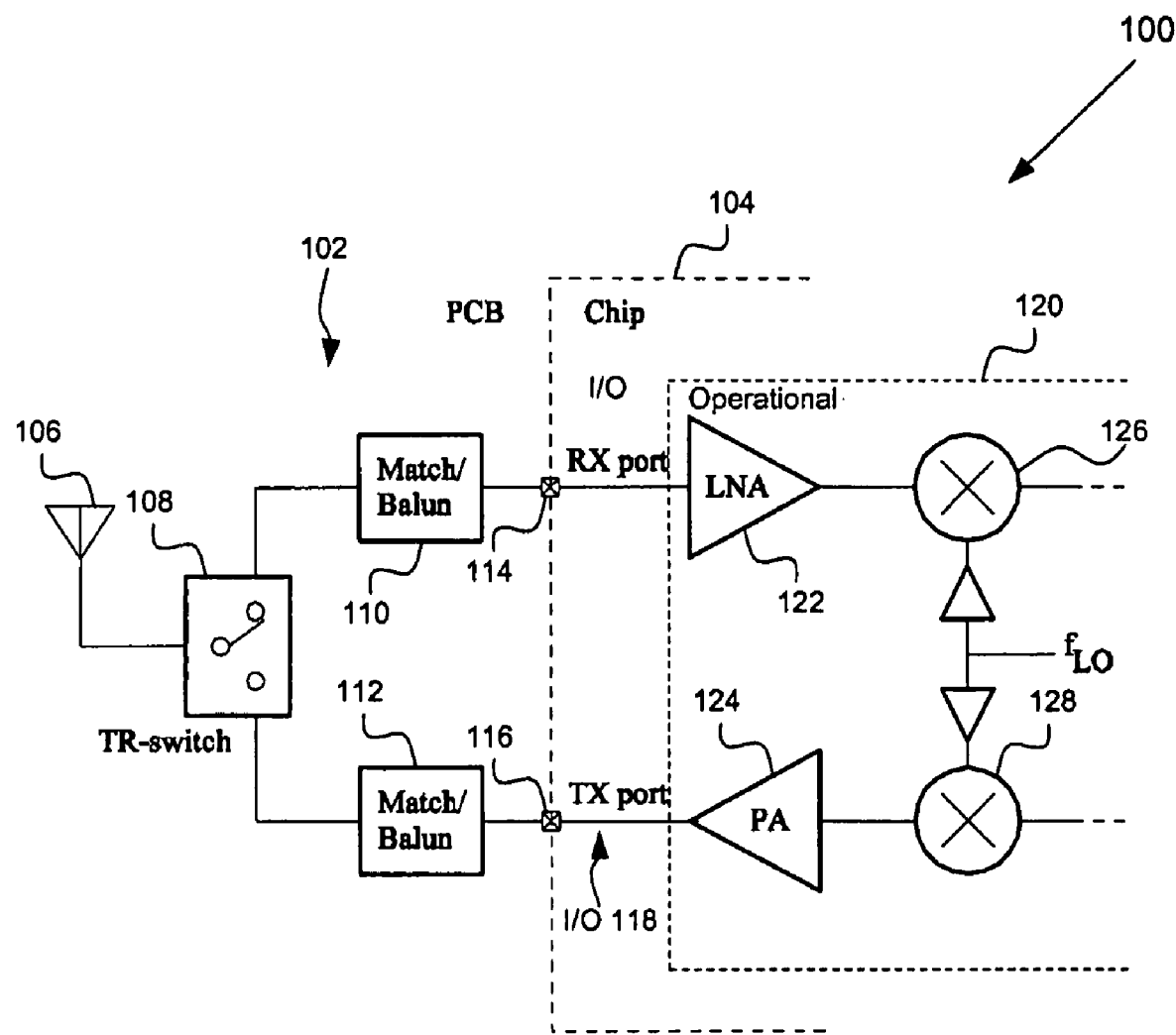
FIG. 1 shows a transceiver system having a single mode I/O portion, according to one embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a transceiver chip comprising and operational section and an input/output section. The operational section includes a controller. The input/output (I/O) section is coupled to the operational section. The I/O section comprises a transformer and a switching device including first and second transistors. The transformer includes a primary side connected to first and second I/O ports and a secondary side connected to the operational section. The switching device is coupled to the controller and between the first and second I/O ports and a bias port. After choosing an I/O port to be used, the controller causes the switching device to connect one of the first and second I/O ports to the ground port. This can be done through turning ON or OFF of a respective one of the first and second transistors. Turning OFF of the transistor causes an open circuit between a chosen I/O port and the bias port and turning ON of the transistor causes a short circuit between the non-chosen I/O port and the bias port.

The transmission medium can be, but is not limited to wire or wireless transmission, or any other form of transmission, as would become apparent to one of ordinary skill in the art upon reading this description.

Transmission signals can be, but are not limited to, baseband, modulated, frequency band, or similar signals, as would become apparent to one of ordinary skill in the art upon reading this description.

Throughout this description, a transmitted signal or a device processing a transmitted signal (e.g., a signal being transmitted from the chip via an antenna) is designated T or TX and a received signal or a device processing a received signal (e.g., a signal received at an antenna and being transmitted to the chip) is designated R or RX.

Throughout this description a "chip" is considered a small piece of semi-conducting material (e.g., silicon) on which an integrated circuit is embedded, which can contain millions of electronic components (e.g., transistors). For example, the chip can be, but is not limited to, CPU chips (i.e., microprocessors), memory chips, single in-line memory modules (SIMMs), dual in-line memory modules (DIMMs), and the like, which can be in one of many known packages. For example, a package can be, but is not limited to, a DIPs (Dual in-line packages), PGAs (Pin-grid arrays), SIPs (Single in-line packages).

Exemplary Single Mode I/O Section for a Transceiver

FIG. 1 shows a system 100. In one example, system 100 is a transceiver system or a radio frequency (RF) transceiver. System 100 includes a board 102 (e.g., a printed circuit board (PCB) or the like) coupled to a chip 104 coupled to board 102. The coupling can be accomplished through any known coupling technique, for example, but not limited to, via a package structure as described above, a leadframe, or the like, as would become apparent to one of ordinary skill in the art.

Board 102 includes an antenna 106, a switch 108 (e.g., a transmit/receive (TR) switch), and first and second match/Balun devices 110 and 112. First and second match/balun devices 110 and 112 are connected to first and second ports 114 and 116, respectively, of chip 104. In the example shown, first port 114 is a RX port (receiving port) and second port 116 is a TX port (transmitting port) of chip 104. In this example, a signal received at antenna 106 is routed via switch 108 through match/Balun device 110 to first port 114 of chip 104. A signal being transmitted from chip 104 via second port 116 is transmitted through match/Balun device 112 and routed using switch 108 to antenna 106 for transmission.

The match sections of respective match/balun devices 110 and 112 are used as impedance matching networks between antenna 106 and chip 104. The balun section in match/balun device 110 is used to convert a single-ended received signal from antenna 106 to a differential signal, while a balun section in match/Balun device 112 is used to convert a differential signal from chip 104 to a single ended signal to be transmitted by antenna 106. The match/balun circuit is well known in the transceiver art.

Chip 104 comprises an 1/0 section 118 and an operational section 120. In this example, 1/0 section 118 comprises first and second ports 114 and 116. Operational section 120 comprises a first amplifier 122 (e.g., a low noise amplifier (LNA)) connected to first port 114 and a second amplifier 124 (e.g., a power amplifier (PA)) connected to second port 116. Integrated LNA and PA are well known in the transceiver art.

First amplifier 122 is used to amplify a RX signal received at first port 114, which is then transmitted to mixer 126. A frequency of the RX signal is down converted using frequency $f_{LO}$ before being processed by other devices (not shown) in operational section 120.

Second amplifier 124 is used to amplify a TX signal being transmitted out second port 116 by chip 104. A frequency of the TX signal is first up converted using mixer 128 and frequency $f_{LO}$ before being amplified using second amplifier 124. In one example, the transmission signal TX originates in a device in operational section 120 of chip 104.

However, in order to lower a total cost of system 100, it is desirable to reduce a number of components external to chip 104, i.e., components on board 102.

Figure 2:
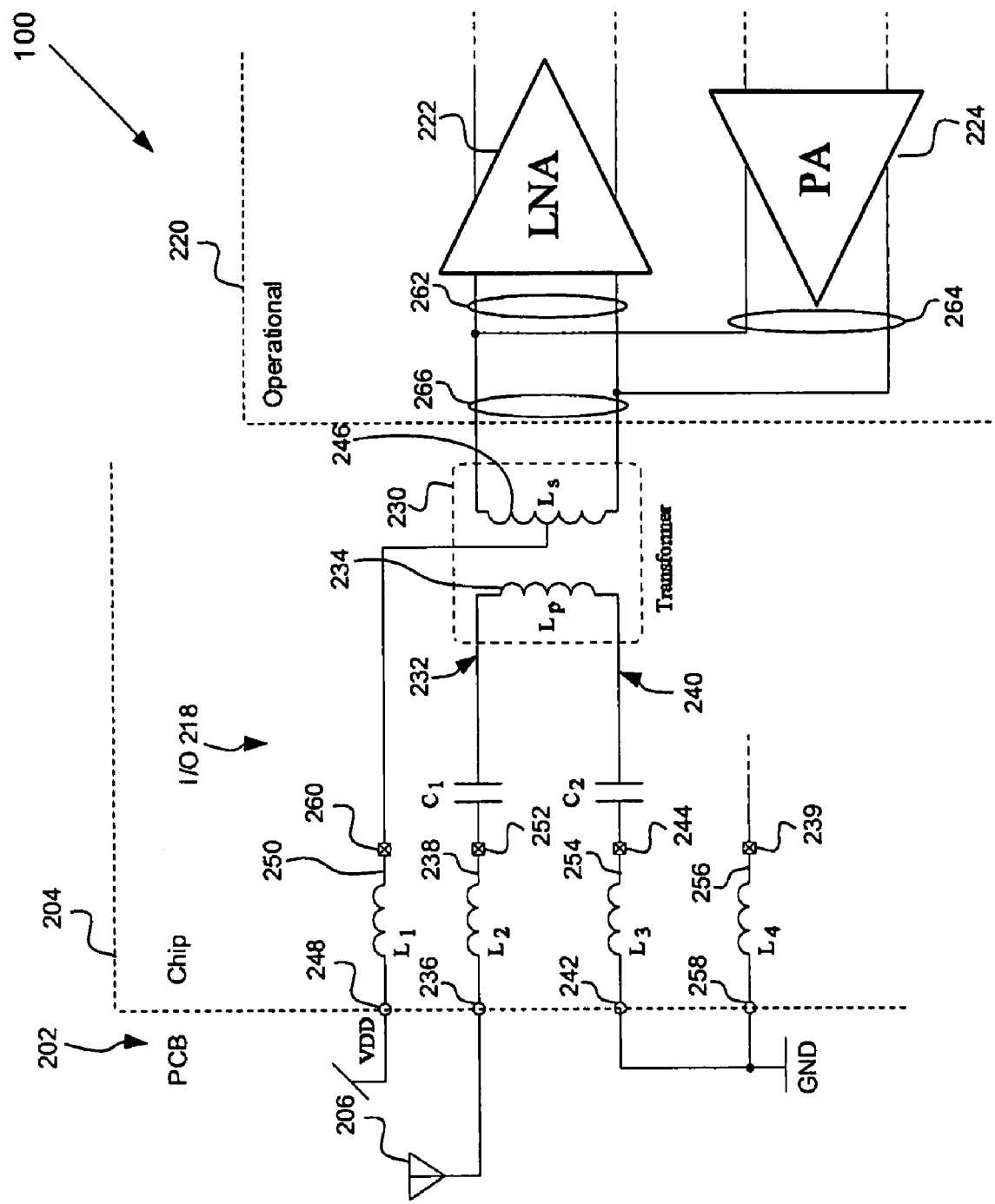
FIG. 2 shows a transceiver system having a single mode I/O portion, according to one embodiment of the present invention.

FIG. 2 shows a system 200. In one example, system 200 is a transceiver system or a radio frequency (RF) transceiver. System 200 includes a board 202 and a chip 204. Board 202 includes an antenna 206. Chip 204 includes an I/O section 218 and an operational section 220.

I/O section 218 of chip 204 includes a transformer 230. A first end 232 of a primary side 234 of transformer 230 is coupled to a TX/RX port 236 through a wire bond 238, whose characteristic inductance is shown as L2. A second end 240 of primary side 234 is coupled to a port 242 through a wire bond 254, whose characteristics inductance is shown as L3. In this example, port 242 is coupled to ground (GND) or bias source VSS on board 202. A center tap of a secondary side 246 of transformer 234 is coupled to a port 248 through a bond wire 250, whose characteristic impedance is shown as L1. In this example, port 248 is coupled to a bias source VDD possibly on board 202 or otherwise located. In this example, the center tap of secondary side 246 of transformer 230 is coupled to bond wire 250 via a node or bond pad 260.

In one example, in order to offset the inductances L2 and L3 capacitors C1 and C2 are used, respectively, which should result in a desired impedance (e.g., 50Ω) looking into ports 236 and 242. Capacitor C1 is coupled at node or bond pad 252 to bond wire 238 and to first end 232 of primary side 234 of transformer 230. Capacitor C2 is are coupled at node or bond pad 254 to bond wire 244 and to second send 240 of primary side 234 of transformer 230.

In one example, an additional bond wire 256 is coupled to a port 258 and a node or bond pad 259. This additional bond wire can be used to connect a desired portion of I/O section 218 or operational section 220 to port 258, i.e., to ground (GND) on board 202.

In system 200, an I/O section 218 is used to integrate TR-switch functionality, single-ended to differential conversion, and matching. The TR switch functionality is achieved by connecting LNA inputs 262 and PA outputs 264 together. By adjusting an ON and OFF state of LNA/PA impedances, a PA output signal is not dissipated in LNA 222 in TX mode and a receive signal is not dissipated in PA 264 in RX mode.

In one example, in operational section 220 a combined LNA/PA differential port 266 is connected to secondary side 246 of a transformer 230. This configuration serves at least two purposes: 1) differential to single-ended conversion and 2) to provide impedance matching. Differential to single-ended conversion is achieved by grounding second end 240 of primary side 234 of transformer 230 and using port 236 as a RF-I/O port. Also, by accurately adjusting the parameters of transformer 230, such as turns ratio Ls/Lp and Quality factor (Q) with all the parasitic components taken into account, transformer 230 can be designed to provide the desired impedance match at port 236.

At higher frequencies, package non-idealities, such as bond wire inductances L1-L4 and parasitic capacitances, influence RF performance and have to be taken into account. In the arrangement shown, bond wires inductances L2 and L3 and series capacitors C1 and C2 may form series resonant circuits that resonate at a frequency of interest and provide a low impedance path from respective ports 236 and 242 to transformer primary side 234.

Figure 3:
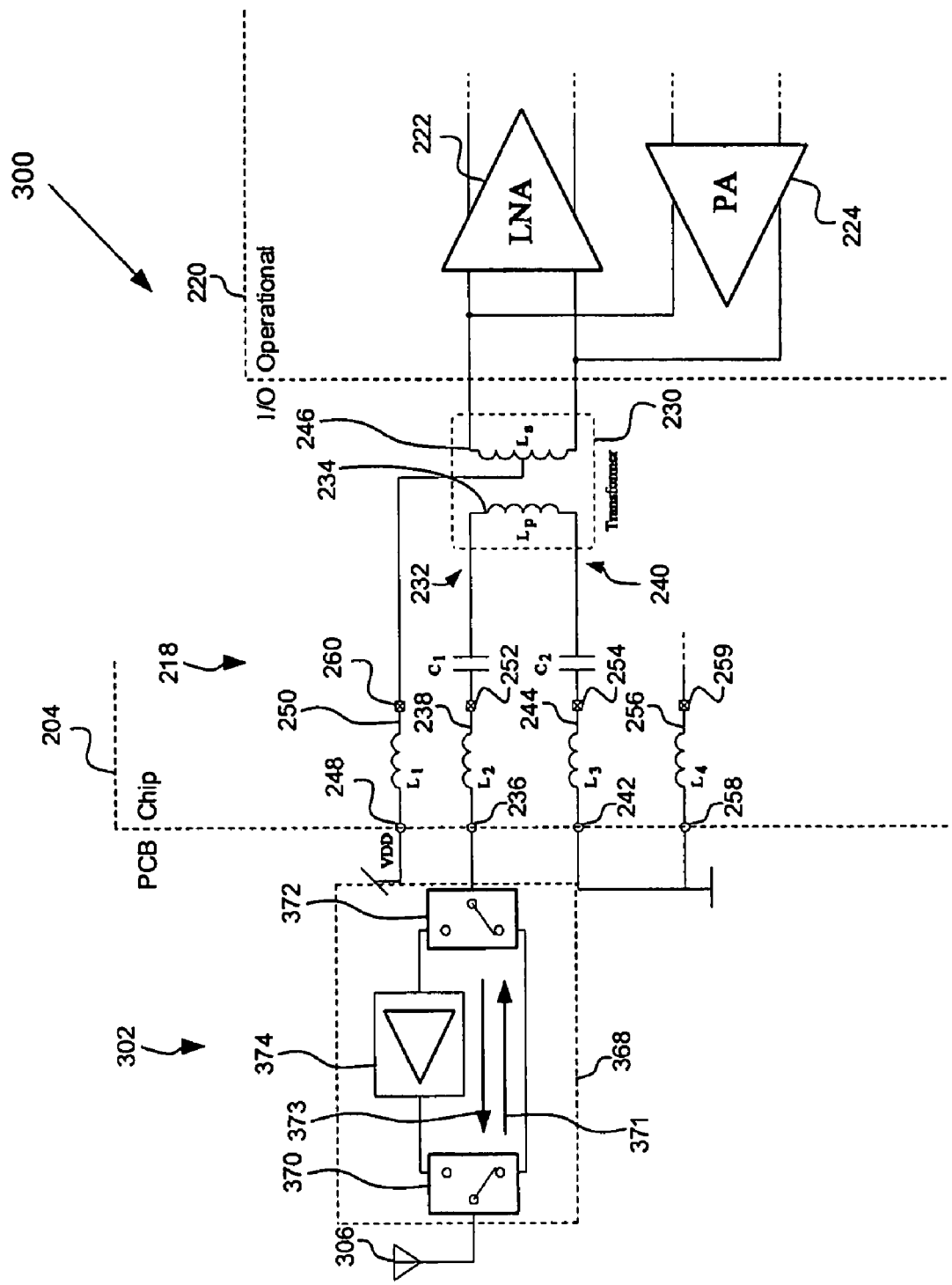
FIG. 3 shows a transceiver system having a single mode I/O portion, according to one embodiment of the present invention.

FIG. 3 shows a system 300. In one example, system 300 is a transceiver system or a radio frequency (RF) transceiver. A main difference between systems 200 and 300 is that a board 302 in system 300 includes a multiplexing system 368 between an antenna 306 and port 236. Multiplexing system 368 includes first and second switches 370 and 372, respectively, and an amplifier 374 (e.g., a power amplifier (PA)).

A first path 371 (e.g., an RX path) through multiplexing system 368 allows a received signal from antenna 306 to be transmitted to port 236 when both switches 370 and 372 are in their down position.

A second path 373 (e.g., a TX path) through multiplexing system 368 allows a signal from port 236 to be transmitted via PA 374 to antenna 316 when both switches 370 and 372 are in their up position.

In some applications it is desirable to have separate access to the TX and RX ports, but without sacrificing the high level of integration shown in FIG. 2. For example, in certain applications a higher output power may be required and chip 204 has to accommodate an external PA 374 (i.e., a PA external to chip 204). Thus, the topology in FIG. 2 is modified in order to provide the separate TX and RX paths, described above, through multiplexer 368. External PA 374 will then be inserted into the TX path.

Exemplary Multi-Mode I/O Section for a Transceiver

As discussed above, it is desirable to reduce a number of components on an external board (i.e., a board external to a chip), while allowing for multi-mode (TX and RX) functionality. The following embodiments allow for multi-mode operation of a chip's I/O circuit through dedicated ports, while integrating the multi-mode functionality on the chip.

Figure 4:
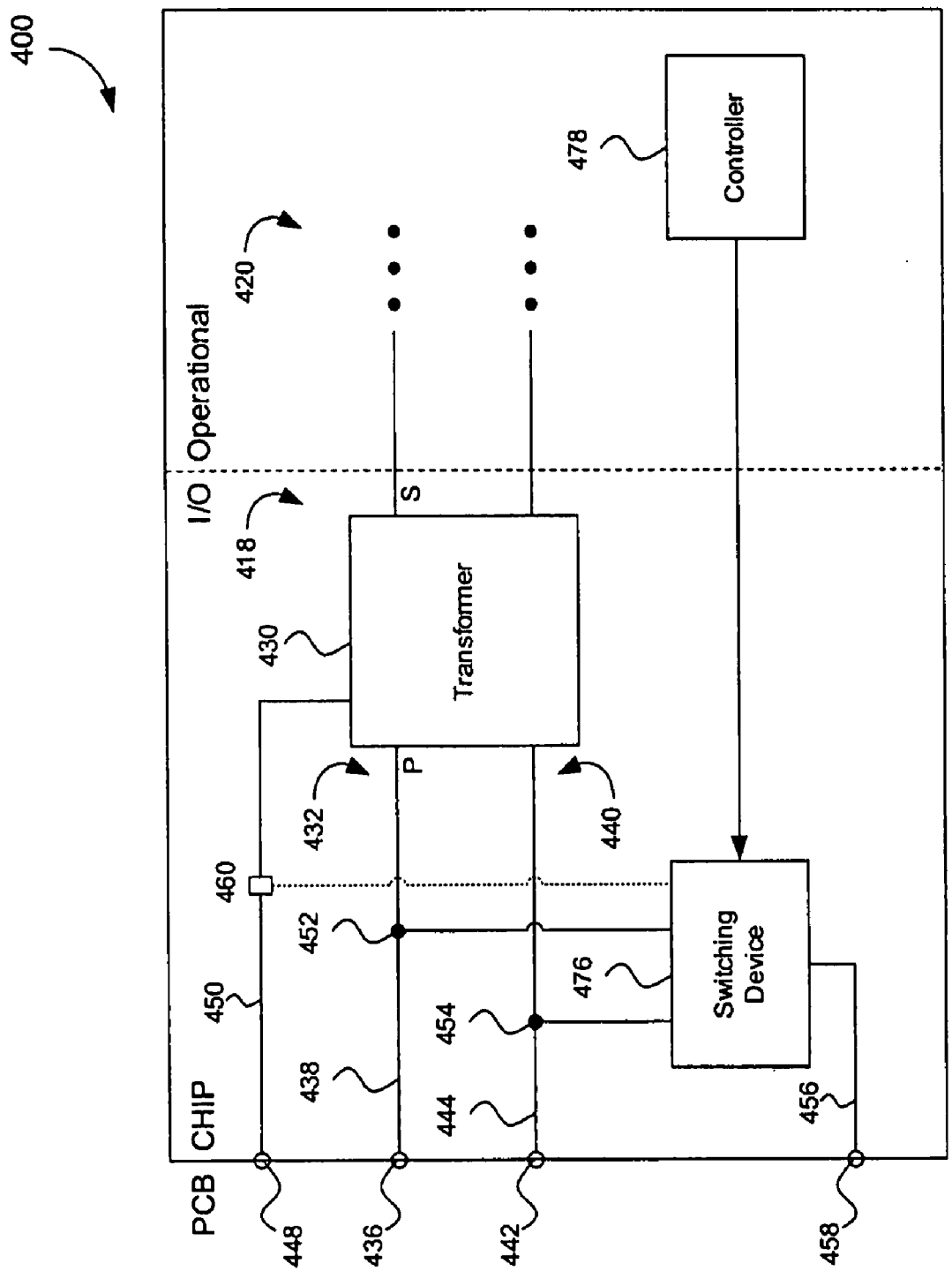
FIG. 4 shows a transceiver system having a multiple mode I/O portion, according to one embodiment of the present invention.

FIG. 4 shows a system 400. In one example, system 400 is a transceiver system or a radio frequency (RF) transceiver. A main difference between system 400 and previous systems described above is that an I/O section 418 of chip 404 includes a switching device 476 and an operational section 420 of a chip 404 includes a controller 478. In this configuration, switching device 476 is controlled by a controller 478 to control which of ports 436 or 442 are active ports (e.g., able to send or receive signals) and which of ports 436 or 442 are inactive ports (e.g., grounded or biased so as not to receive or transmit signals).

Switching device 476 is coupled between pads or nodes 452 and 454 and a port 458. In this example, port 458 is coupled to ground. Node 452 is positioned between a port 436 (e.g., an I/O port) and a first end 432 of a primary side P 432 of a transformer 430. Node 454 is positioned between a port 442 (e.g., an I/O port) and a second end 440 of primary side P 432 of transformer 430. In this example, through control signals from controller 478, switching device 476 grounds or otherwise biases one of ports 436 or 442, allowing the ungrounded port to transmit or receive signals.

In the implementations discussed above in relation to FIGS. 1-3, one of the transformer primary ports is used as an RF-I/O and the other primary port always needs to be grounded, which is done externally on the PCB. In contrast, in the embodiment shown in FIG. 4, a multi-mode implementation is shown in which either of the primary ports 436 or 442 can be internally selectable, using switch 476 and controller 478, as an RF-I/O terminal.

It is to be appreciated that one or more components in system 400 can be programmable software or firmware.

Figure 5:
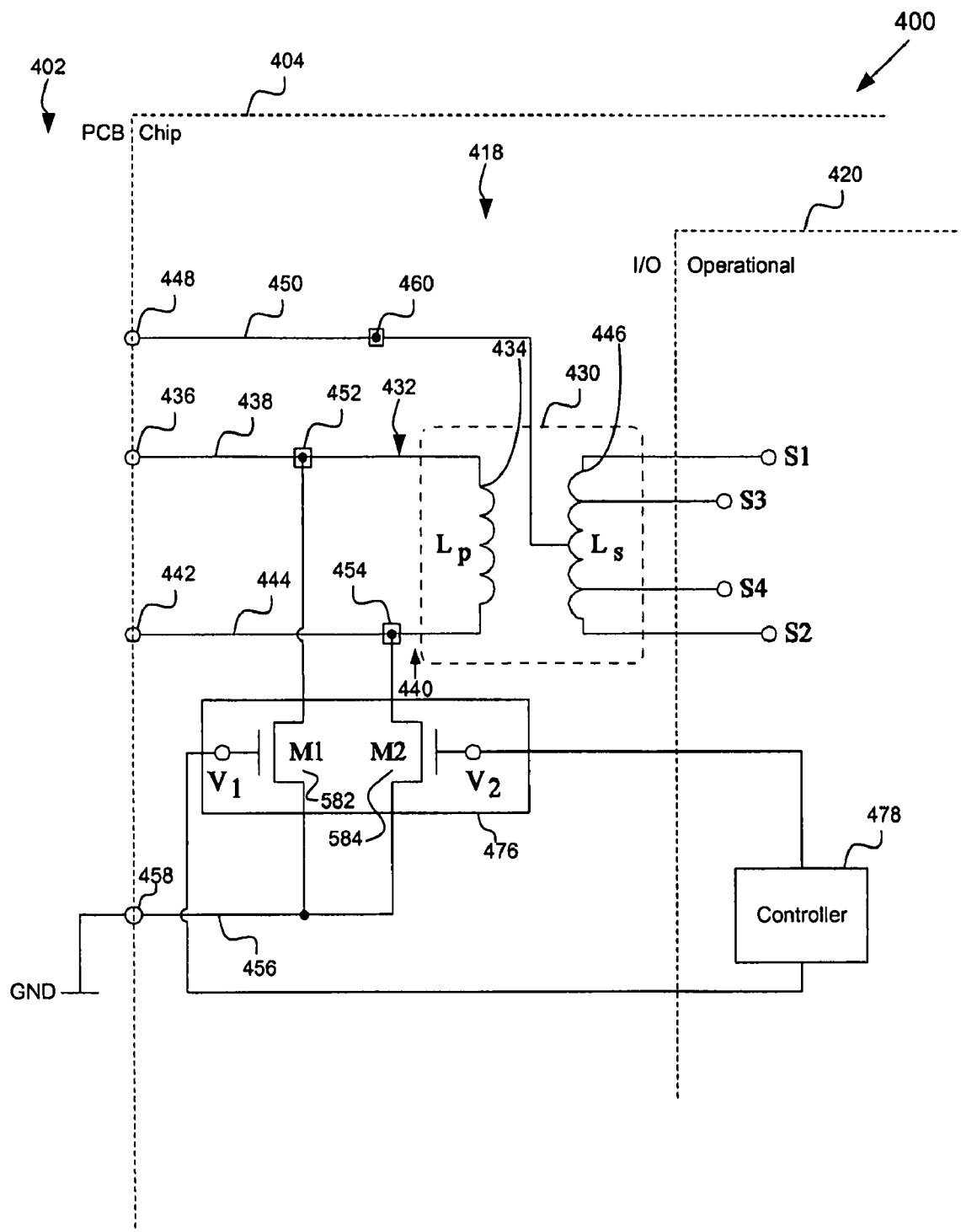
FIG. 5 shows a transceiver system having a multiple mode I/O portion, according to one embodiment of the present invention.

In another example, switching device 476 is coupled between nodes 452 and 454 and node 460, i.e., to a bias port 448. In this example, switching device 476 is not coupled to port 458 at all. Bias port 448 is coupled to a power source (not shown), which is located either on a board 402, or otherwise located. In this example, through control signals from controller 478, switching device 476 biases one of ports 436 or 442 via bias port 448, allowing the unbiased port to transmit or receive signals FIG. 5 is a schematic diagram of system 400 in FIG. 4. In this embodiment, switching device 476 includes first and second transistors 582 and 584. In one example, first and second transistors 582 and 584 are NMOS-transistors M1 and M2, respectively, that act as switches that connect at their drains to respective ones of nodes 452 and 454 and at their sources to port 458.

In this example, the operation of system 400 is as follows. To enable port 436 as the RF-I/O, a LOW control signal or gate voltage V1 from controller 478 biases first transistor 582 and a HIGH control signal or gate voltage V2 from controller 478 biases second transistor 584. In this state, transistor 582 is OFF or open. Also, in this state, transistor 584 is ON or shorted, which essentially grounds port 442 through coupling port 442 to node 458.

Similarly, to enable port 442 as the RF-I/O, gate voltage V1 is HIGH and gate voltage V2 is LOW. In, this state transistor 582 is ON or shorted, which essentially grounds port 436 through coupling port 436 to node 458. Also, in this state, transistor 584 is OFF or open.

In one example, as seen in FIG. 5, at a secondary side 446 of transformer 430 there is no theoretical restriction to a number of ports or tapping points that can be used. In the example shown, symmetric port pairs S1-S2 and S3-S4 are shown. For example, if different transformation ratios are required between the LNA and PA, a LNA (not shown) may be connected to ports S1-S2 and a PA (not shown) may be connected to ports S3-S4.

In one example, in order to achieve a desired performance for system 400 (e.g., best symmetry and lowest insertion loss and noise figure), the grounded port has as low an impedance as possible at a frequency of interest. This can result in an increased W/L (width to length ratio, or size) of the NMOS switches 582 and 584, but usually parasitic capacitances associated with switches 582 and 584 will set an upper limit of W/L. The sources of switches 582 and 584 also need to connect to a good ground GND on board 402 through port 458.

It is to be appreciated that with this scheme, when both V1 and V2 are LOW both transistors 582 and 584 are OFF, neither of ports 436 or 442 will be grounded and transformer 430 can be used similar to transformer 230 in system 200 of FIG. 2.

In the example discussed above (not shown in FIG. 5), when switching device 476 is coupled between nodes 452 and 454 and node 460, and not to bias port 458, switching device 476 includes two PMOS transistors with their drains coupled to node 460 and their sources connected to respective ones of nodes 452 and 454. In this example, operation of switch 476 would be modified to reflect the functionality of PMOS devices versus NMOS devices, as would become apparent to one of ordinary skill in the art upon reading this description.

Figure 6:
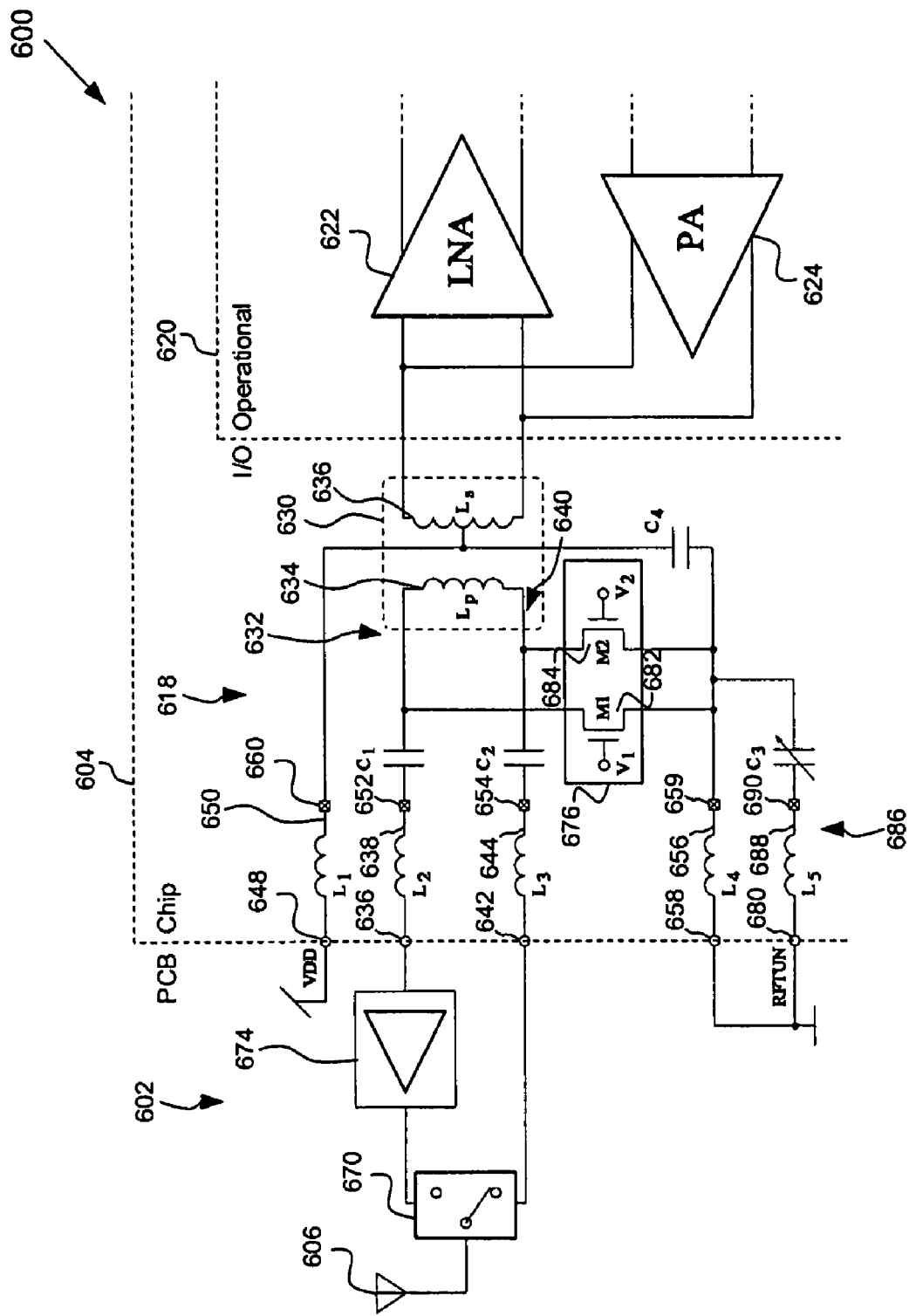
FIG. 6 shows a transceiver system having a multiple mode I/O portion, according to one embodiment of the present invention.

FIG. 6 shows a system 600. In one example, system 600 is a transceiver system or a radio frequency (RF) transceiver. System 600 includes a board 602 comprising an antenna 606, a switch 670, and an amplifier 674. Switch 670 routes a signal from antenna 606 to node 642 when system 600 is in RX mode, and switch 670 routes a signal from node 636, through amplifier 674, and to antenna 606 when system 600 is in TX mode.

System 600 is similar to a combination of system 300 shown in FIG. 3 and system 400 shown in FIGS. 4-5, with a difference being that because the RF-I/O port now can be alternated between ports 636 and 642, one external TR-switch (e.g., 372) can be removed. In the example shown in FIG. 6, port 636 is used for a TX output and port 642 is used for a RX input. In one example, a switching device 676 includes NMOS transistors 682 and 684. Thus, in this example, for TX output active V1=LOW and V2=HIGH and for RX input V1=HIGH and V2=LOW.

It is to be appreciated, as described above, PMOS transistors could also be used in switching device 676 if its coupling was modified in I/O portion 618.

Another difference between system 600 and the combination of systems 200 and 400 is that in system 600 ground GND on board 602 does not provide low impedance paths to chip 604. Thus, chip 604 includes an additional port 680 (e.g., a RFTUN pin or RF tuning pin) that is used to tune the ground at the sources of transistors 682 and 684 to achieve a lowest possible impedance at a desired frequency. This is accomplished through the use of a series resonant circuit 686. Circuit 686 comprises a bond-wire 688, whose characteristic is shown as inductance L5, and capacitor C3. Capacitor C3 is coupled between a bond pad or node 690 and a node 659. Node 659 couples the sources of transistors 682 and 684 to a bond wire 656 that is connected to ground through node 658. Capacitor C3 is an adjustable capacitor that is adjusted to tune the ground. In one example, the adjustment is performed via programming of capacitor C3 after chip 604 is manufactured or after the chip is packaged, as is discussed above. Capacitor C3, similar in function to capacitors C1 and C2, is used to offset inductance L5 to produce a zero impedance looking at sources 682 and 684.

In one example, a bypass capacitor C4 is coupled between a center tap of a secondary side 636 of transformer 603 and node 659. In this arrangement, capacitor C4 further improves the ground by capacitively effectively coupling L1 and L4 in parallel.

Figure 7:
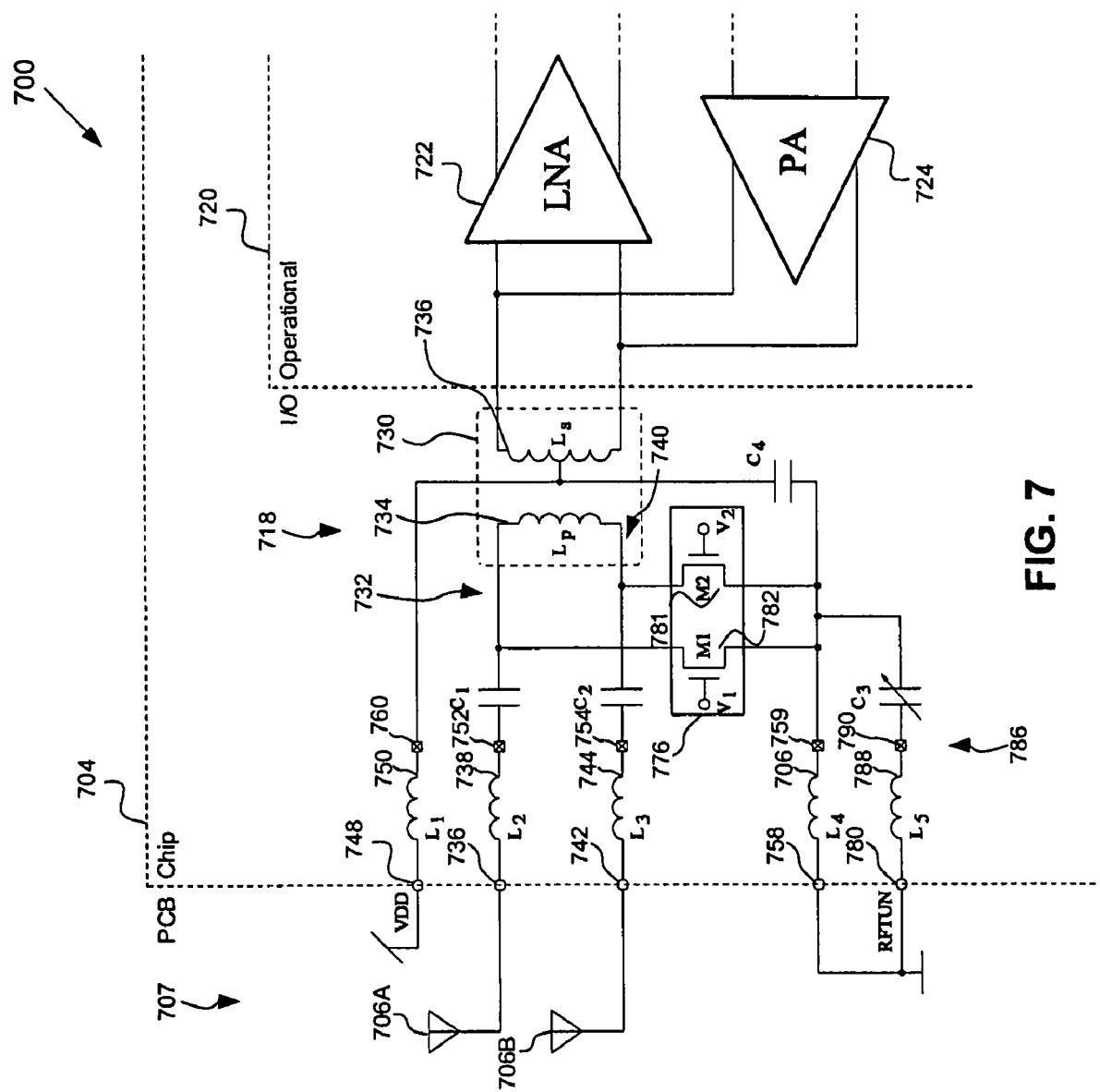
FIG. 7 shows a transceiver system having a multiple mode I/O portion, according to one embodiment of the present invention.

FIG. 7 shows system 700. In one example, system 700 is a transceiver system or a radio frequency (RF) transceiver. A main difference between system 700 and system 600 is that a one antenna system of system 600 is replaced with a two antenna system in system 700. Thus, in system 700 a board 702 includes a first antenna 706A coupled to a node 736 and a second antenna 706B coupled to a node 742. It is to be appreciated that which antenna 706A or 706B to use, either for RX or TX, is controlled by gate voltages V1 and V2 of transistors 782 and 784. Otherwise, this system 700 operates similar to systems 400 and 600 described above.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   (a) receiving a signal through a receiver port while a transmitter port is coupled to a first port;
   (b) transmitting the signal through the transmitter port while the receiver port is coupled to the first port; and
   (c) selectively coupling the receiver port or transmitter port to a second port while step (a) or (b) is occurring, wherein
      the receiver port is coupled to the second port when the signal is transmitted, and
      the transmitter port is coupled to the second port when the signal is received.

2. The method of claim 1, wherein step (a) comprises:
   (a)(1) using a switching device to couple the transmitter port to the first port when the signal is received.

3. The method of claim 2, wherein step (a)(1) comprises activating a transistor to couple the transmitter port to the first port.

4. The method of claim 3, wherein the activating step comprises transferring a source voltage, which is coupled to the first port, to the transmitter port.

5. The method of claim 1, wherein step (b) comprises:
   (b)(1) using a switching device to couple the receiver port to the first port when the signal is transmitted.

6. The method of claim 5, wherein step (b)(1) comprises activating a transistor to couple the receiver port to the first port.

7. The method of claim 6, wherein the activating step comprises transferring a source voltage, which is coupled to the first port, to the receiver port.

8. The method of claim 7, wherein transferring the source voltage comprises coupling the first port to a source voltage.

9. The method of claim 1, further comprising:
   (d) tuning an adjustable compensation device to substantially reach real ground while the transmitter port and receiver port are coupled to the first port.

10. The method of claim 1, wherein step (c) comprises:
    (c)(1) using a switching device to controllably couple the receiver port or transmitter port to the second port.

11. The method of claim 10, wherein step (c)(1) comprises transferring a source voltage, which is coupled to the second port, to the receiver port or transmitter port.

12. A system, comprising:
    a controller;
    a transformer including a primary side coupled to a first and second port and a secondary side coupled to the controller; and
    a switching device coupled to the controller and between the first port, the second port, a third port, and a fourth port, the switching device coupling the first port or the second port to either the third port or the fourth port.

13. The system of claim 12, further comprising:
    a first bond wire connected between the first port and a first node, the first node also being connected to a first end of the primary side of the transformer and the switching device;
    a first compensation device connected between the first port and the first node, wherein the compensation device reduces impedance caused by inductance associated with the first bond wire;
    a second bond wire connected between the second port and a second node, the second node also being connected to a second end of the primary side of the transformer and the switching device; and
    a second compensation device connected between the second port and the second node, wherein the compensation device reduces impedance caused by inductance associated with the second bond wire.

14. The system of claim 13, further comprising:
    a tuning port;
    an adjustable compensation device coupled between the switching device, the third port, and the tuning port, wherein the adjustable compensation device tunes the third port to substantially real ground.

15. The system of claim 14, further comprising:
    a center tap node coupled to a center tap of the secondary side of the transformer;
    the fourth port coupled to the center tap node; and
    a capacitor coupled between the center tap node and the adjustable compensation device.

16. The system of claim 12, wherein the controller, transformer, and switching device are located on a chip, and the system further comprises:
    a board coupled to the chip, the board comprising an antenna coupled to the first and second ports of the chip.

17. The system of claim 16, wherein:
    the antenna is coupled to the first port when the second port is coupled to the fourth port; and the antenna is coupled to the second port when the first port is coupled to the fourth port.

18. An apparatus, comprising
a means for receiving a signal through a receiver port while a transmitter port is coupled to a first port;
a means for transmitting the signal through the transmitter port while the receiver port is coupled to the first port; and
a means for selectively coupling the receiver port or transmitter port to a second port, wherein
the receiver port is coupled to the second port when the signal is transmitted, and
the transmitter port is coupled to the second port when the signal is received.

19. The apparatus of claim 18, wherein the means for coupling the transmitter port and receiver port to the first port comprises a means to reduce the number of components on a transceiver printed circuit board by forming a common data path for the receipt and transmission of signals.

20. The apparatus of claim 18, wherein the means for selectively coupling comprises a means to bias internal receiver and transmission nodes of a transceiver system to a source voltage originating from a printed circuit board or an external source.

* * * * *